United States Patent [19]

Ciaccia et al.

[11] Patent Number: 4,829,109

[45] Date of Patent: May 9, 1989

[54] POLYMERIC COMPOSITIONS SUITABLE FOR USE AS BITUMEN MODIFIERS AND BITUMINOUS COMPOSITIONS SO MODIFIED

[75] Inventors: Vittorio Ciaccia, Ferrara; Federico Milani, S. Maria Maddalena, both of Italy

[73] Assignee: Ausimont S.p.A., Milan, Italy

[21] Appl. No.: 860,917

[22] Filed: May 8, 1986

[30] Foreign Application Priority Data

May 9, 1985 [IT] Italy .................. 20638 A/85

[51] Int. Cl.$^4$ ............ C08L 95/00; C08L 31/04; C08L 23/12; C08L 23/16
[52] U.S. Cl. ............................ 524/68; 524/69; 524/70; 525/222; 525/54.5
[58] Field of Search .......... 525/222, 54.5; 524/70, 524/69, 68

[56] References Cited

U.S. PATENT DOCUMENTS

| | | | |
|---|---|---|---|
| 3,144,423 | 8/1964 | Belak et al. ............ | 524/70 |
| 3,154,508 | 10/1964 | Clelland ................. | 524/70 |
| 3,222,706 | 5/1967 | McAninch .............. | 524/69 |
| 3,309,329 | 3/1967 | Schultz et al. .......... | 524/69 |
| 3,395,110 | 7/1968 | Crady .................... | 524/70 |
| 3,442,841 | 5/1969 | Adelman ................ | 524/69 |
| 3,459,695 | 8/1969 | Hedge et al. ........... | 524/70 |
| 3,790,519 | 2/1974 | Wahlborg ............... | 524/70 |
| 3,941,859 | 3/1976 | Batiuk et al. ........... | 525/222 |
| 4,000,140 | 12/1976 | Tierney .................. | 524/69 |
| 4,032,600 | 6/1977 | Mac Adams et al. ... | 525/222 |
| 4,069,181 | 1/1978 | Healy et al. ............ | 524/70 |
| 4,232,132 | 11/1980 | Griga et al. ............ | 525/222 |
| 4,379,888 | 4/1983 | Yoshimura et al. .... | 525/222 |

FOREIGN PATENT DOCUMENTS

2045624 3/1972 Fed. Rep. of Germany .

56-127646 10/1981 Japan .

*Primary Examiner*—Carman J. Seccuro
*Attorney, Agent, or Firm*—Stevens, Davis, Miller & Mosher

[57] ABSTRACT

(1) Polymeric compositions, suitable for use as bitumen modifiers, comprising, by weight:
  (a) 20–50% of an ethylene/propylene elastomeric copolymer containing from 60 to 75% by weight of ethylene, and having a value of Mooney viscosity (ML 1+4) at 100° C. higher than 5;
  (b) 0–25% of polypropylene prevailingly constituted by isotactic macromolecules having an M.I. value higher than 1;
  (c) 0–70% of substantially amorphous polypropylene, possibly in mixture with amorphous copolymers of ethylene with propylene, such component (c) having a total combined ethylene content lower than 60% by weight, and intrinsic viscosity (in tetralin at 135° C.) lower than 2 dl/g;
  (d) 0–25% of polyethylene having density comprised between 0.98 and 0.96 g/cm$^3$, and having a value of M.I. higher than 5;
  (e) 0–25% of an ethylene/vinyl acetate (EVA) copolymer containing from 60 to 95% by weight of ethylene, having a value of M.I. higher than 0.1, and with the condition that when component (c) is equal to zero, the component d and the component e are each present in an amount greater than 15% by weight, the sum of components from (a) to (e) being=100.

(2) Bituminous compositions comprising, in mixture, from 10% to 30% by weight, as referred to the total composition weight, of a polymeric composition as defined above.

7 Claims, No Drawings

POLYMERIC COMPOSITIONS SUITABLE FOR USE AS BITUMEN MODIFIERS AND BITUMINOUS COMPOSITIONS SO MODIFIED

BACKGROUND OF THE INVENTION

1. Field of the Invention

The present invention relates to polymeric compositions suitable to be used as agents for bitumen modification, as well as to the so modified bituminous compositions.

2. Description of the Prior Art

The use is known of bituminous compositions, as sheaths, in the water-proofing of civil and industrial buildings. Such compositions are prevailingly constituted by bitumen of the distillate type, and generally contain modifier agents which improve their physical-mechanical characteristics—in particular, their resistance to high-temperature penetration and their low-temperature flexibility. Such agents are generally constituted by amorphous polypropylene (in amount of from 20 to 30% by weight), possibly in combination with amorphous or low-crystallinity olefinic copolymers having low molecular weight.

THE PRESENT INVENTION

The Applicant has found now that it is possible to confer to bitumens improved characteristics of low-temperature flexibility and of strength to high-temperature penetration, by using a modifier agent consisting of a polymeric composition comprising, by weight:

(a) 20–50% of an ethylene/propylene elastomeric copolymer containing from 60 to 75% by weight of ethylene, and having a value of Mooney viscosity (ML 1+4) at 100° C. higher than 5 and preferably comprised within the range of from 8 to 40;

(b) 0–25% of polypropylene prevailingly constituted by isotactic macromolecules having M.I. greater than 1 and preferably comprised within the range of from 5 to 15;

(c) 0–70% of substantially amorphous polypropylene, possibly in mixture with amorphous copolymers of ethylene with propylene, such component (c) having a total combined ethylene content lower than 60% by weight, and intrinsic viscosity (in tetralin at 135° C.) lower than 2 dl/g and preferably comprised with the range of from 0.1 to 1;

(d) 0–25% of polyethylene having density comprised between 0.98 and 0.96 g/cm$^3$, and having a value of M.I. higher than 5 and preferably comprised within the range of from 10 to 30;

(e) 0–25% of an ethylene/vinyl acetate (EVA) copolymer containing from 60 to 95% by weight of ethylene, having a value of M.I. higher than 0.1, and preferably comprised within the range of from 0.5 to 200; with the condition that when component (c) is equal to zero, the component d and the component e are each present in an amount greater than 15% by weight, the sum of components from (a) to (e) being = 100.

The polymeric compositions as defined above can be used as modifiers for bitumen by mixing with this latter. Inert mineral fillers, such as silica, kaolin, micas, calcium carbonate etc., can be present in the mixture of bitumen with such modifiers, in amounts of up to 20% by weight as referred to the total mixture weight.

The above said modifier compositions can be used in amounts comprised within the range of from 10 to 30%, but preferably of from 12 to 25% by weight, as referred to the total weight of the mixture with bitumen and possible fillers.

An object of the present invention is hence constituted by the polymeric compositions suitable to be used as additives in bituminous compositions, comprising a mixture of components from (a) to (e) in the above indicated proportions.

A further object of the present invention is constituted by the bituminous compositions comprising from 10% to 30% by weight of the polymeric composition as defined above.

The polymeric compositions of the present invention can be prepared in form of granules by mixing their components either in extruder, or in Banbury or roller mixer, at such temperatures as to allow such components to be intimately mixed in the mixture, and subsequent granulation.

The bituminous compositions which are the further object of the present invention can be prepared by high-temperature mixing bitumen (possibly with the addition of inert mineral fillers such as for example kaolin, CaCO$_3$, SiO$_2$, mica) either with 10–30% by weight, with reference to the total weight of the bituminous composition, of the polymeric composition as defined above, or with the individual components thereof, separately added in an altogether equivalent amount.

The ethylene/propylene copolymers [component (a)] can be prepared according to known methods. Among such copolymers those obtained by using high-yield catalysts, on the basis of titanium comounds, such as, e.g., those disclosed in U.S. Pat. No. 4,013,823 to the Applicant's name, are preferred.

The following Examples are given to the purpose of illustrating the invention without however constituting a limitation thereof.

(COMPARATIVE) EXAMPLE 1

A bituminous composition is prepared by mixing, in a stainless-steel cylindrical container, at the temperature of 200° C., for 60 minutes and by blade stirrer (500 rpm):

bitumen type 180/200: 65 parts by weight amorphous polypropylene $|\eta|$ = 0.3: 17 parts by weight amorphous polypropylenic copolymer containing 50% by weight of ethylene, having $|\eta|$ = 0.3: 5 parts by weight isotactic polypropylene (Moplen ® F30-S from HIMONT Co. (M.I.: = 12): 3 parts by weight calcium carbonate: 10 parts by weight The characteristics of the bituminous composition are reported in Table I.

EXAMPLE 2

By operating as in Example 1 a bituminous composition is prepared, which is constituted by:

bitumen type 180/200: 76 parts by weight ethylene/propylene copolymer, containing 27% of propylene, having Mooney viscosity = 11 (ML 1+4 at 100° C.): 6.1 parts by weight high-density polyethylene (Eraclene ® VG 5215 from Enichimica Co.) with M.I. = 24.5: 2.4 parts by weight isotactic polypropylene of Example 1: 3.1 parts by weight ethylene/vinyl acetate copolymer, containing 15% of vinyl acetate (M.I. = 0.6): 2.4 parts by weight calcium carbonate: 10 parts by weight The characteristics of the bituminous composition are reported in Table I.

EXAMPLE 3

By using a roller mixer a polymeric blend is prepared, which is constituted by the same components as mentioned in Example 2, in the following proportions:
ethylene/propylene copolymer: 44 parts by weight
high-density polyethylene: 17 parts by weight
isotactic polypropylene: 22 parts by weight
ethylene/vinyl acetate copolymer: 17 parts by weight
The so-obtained blend is extruded and granulated.

Eighteen parts by weight of such granulated blend are mixed at 190° C., for 60 minutes and under stirring (500 rpm) with 72 parts by weight of bitumen of the type used in Example 1 and 10 parts by weight of $CaCO_3$.

A bituminous composition, the characteristics of which are reported in Table I, is thus obtained.

TABLE I

| Examples | 1 (Comparative) | 2 | 3 |
|---|---|---|---|
| Penetration at 25° C. dm (ASTM D5-35) | 46 | 38 | 31 |
| Penetration at 50° C. dm (ASTM D5-35) | 67 | 68 | 48 |
| Low-temperature Flexibility °C. (UNI 8202) | −10 | −13 | −15 |
| Brookfield Viscosity cps | 4000 | 6000 | 7000 |
| Elongation at Break, % Lengthwise (ASTM D412/68) | 20 | 90 | 135 |

COMPARARATIVE EXAMPLE 4

The bituminous composition is prepared as in Comparative Example 1, with the difference that bitumen of type 80/100 is used.

The characteristics of the mixture are reported in Table II.

EXAMPLE 5

In a cylindrical container of 500 cm³ of capacity the following components are blended at 190° C. for 60 minutes under stirring (blade mixer, 500 rpm):
(a) 17 pbw of amorphous polypropylene having $|\eta| = 0.3$;
(b) 3 pbw of isotactic polypropylene of Example 1;
(c) 5 pbw of an ethylene/propylene copolymer, containing 34% by weight of propylene, and having Mooney viscosity (ML 1+4) at 100° C.=18
(pbw = parts by weight).

Such blend is then added, together with 10 pbw of $CaCO_3$, to 65 pbw of bitumen of type 80:100 to obtain a bituminous composition, by operating as in Example 1.

The characteristics of the so-obtained composition are reported in Table II.

EXAMPLE 6

The test of Example 5 is repeated by using an ethylene/propylene copolymer, containing 27% by weight of propylene, having Mooney viscosity (ML 1+4) at 100° C.=34, and adding to bitumen each polymeric component and the filler, separately from each other, thus eliminating the preliminary polymeric blend preparation step.

The characteristics of the bituminous composition so obtained are reported in Table II.

TABLE II

| Physical-mechanical characteristics of bituminous mixtures | Examples | | |
|---|---|---|---|
| | 4 (Comparative) | 5 | 6 |
| Penetration at 25° C. dm | 46 | 43 | 33 |
| Penetration at 50° C. dm | 67 | 67 | 63 |
| Low-temperature °C. Flexibility | −6 | −9 | −6 |
| Brookfield Viscosity cps at 180° C. | 3500 | 5000 | 4000 |
| Elongation at Break, % | 20 | 26 | 28 |
| Shore A Hardness | 61 | 51 | 59 |

We claim:
1. Polymeric compositions suitable for use as bitumen modifiers comprising by weight:
  (a) 20-50% b.w. of an ethylene-propylene elastomeric copolymer containing from 60 to 75% b.w. of ethylene and having a value of Mooney viscosity (ML 1+4) at 100° C. higher than 5, said copolymer being prepared by copolymerization of the monomers in the presence of a Ziegler catalyst based on Ti compounds;
  (b) 12-25% b.w. of polypropylene prevailingly constituted by isotactic macromolecules having M.I. greater than 1,
  (c) a amount greater than 15% and up to 25% b.w. of polyethylene having a density of from 0.96 to 0.98 g/cm³ and having M.I. higher than 5; and
  (d) an amount greater than 15% and up to 25% of an ethylene-vinylacetate copolymer containing from 60 to 95% b.w. of ethylene and having M.I. higher than 0.1.

2. Bituminous compositions comprising from 70 to 90% b.w. of bitumen and from 30 to 10% b.w. of a polymeric composition comprising:
  (a) 20-50% b.w. to an ethylene-propylene elastomeric copolymer obtained by copolymerization of the monomers in the presence of a Ziegler catalyst based on a titanium compound, said copolymer containing from 60 to 75% b.w. of ethylene and having a Mooney viscosity (ML 1+4) at 100° C. higher than 5;
  (b) 12-25% b.w. of polypropylene prevailingly consisting of isotactic macromolecules, having M.I. greater than 1;
  (c) an amount greater than 15% and up to 25% b.w. of polyethylene having a density of from 0.96 to 0.98 g/cm³ and M.I. greater than 5; and
  (d) an amount greater than 15 and up to 25% b.w. of an ethylene-vinylacetate copolymer containing 60-95% b.w. of ethylene and having M.I. greater than 0.1.

3. Compositions according to claim 1 wherein the component (a) has Mooney Viscosity ML (1+4) at 100° C. comprised between 8 and 40.

4. Composition according to claim 1 or 3 wherein the component (b) has M.I. values comprised between 5 and 15.

5. Compositions according to claim 1 or 3 wherein the component (d) has M.I. values comprised between 10 and 30.

6. Compositions according to claim 1 or 3 wherein the component (e) has M.I. values comprised between 0.5 and 200.

7. Bituminous compositions comprising from 50 to 90% by weight of bitumen, from 0 to 20% by weight of an inert mineral filler and from 10 to 30% by weight of one of polymeric compositions according to claim 1.

* * * * *